United States Patent
Seo et al.

(10) Patent No.: US 11,223,683 B2
(45) Date of Patent: Jan. 11, 2022

(54) DETACHABLE IOT MODULE

(71) Applicant: MIRO CO., LTD., Incheon (KR)

(72) Inventors: Dongjin Seo, Incheon (KR); Yongju Oh, Incheon (KR); Minseok Kim, Incheon (KR)

(73) Assignee: MIRO CO., LTD., Incheon (KR)

( * ) Notice: Subject to any disclaimer, the term of this patent is extended or adjusted under 35 U.S.C. 154(b) by 0 days.

(21) Appl. No.: 16/750,901

(22) Filed: Jan. 23, 2020

(65) Prior Publication Data
US 2021/0158974 A1    May 27, 2021

(30) Foreign Application Priority Data
Nov. 27, 2019    (KR) .......................... 10-2019-0154907

(51) Int. Cl.
| | |
|---|---|
| *H04L 29/08* | (2006.01) |
| *G16Y 20/10* | (2020.01) |
| *G16Y 10/80* | (2020.01) |
| *G16Y 40/10* | (2020.01) |
| *G16Y 30/00* | (2020.01) |

(52) U.S. Cl.
CPC .............. *H04L 67/12* (2013.01); *G16Y 10/80* (2020.01); *G16Y 20/10* (2020.01); *G16Y 30/00* (2020.01); *G16Y 40/10* (2020.01)

(58) Field of Classification Search
CPC ........ G16Y 10/80; G16Y 20/10; G16Y 40/10; G16Y 30/00; G06F 1/163; G06F 1/626; G06F 1/656; G06F 1/658; H01Q 1/243; H04M 1/0202; H04M 1/026; H04M 1/0266; H04M 1/0277; H04L 67/12
See application file for complete search history.

(56) References Cited

U.S. PATENT DOCUMENTS

| | | | |
|---|---|---|---|
| 2017/0344056 A1* | 11/2017 | Kim | .................... H04L 12/2832 |
| 2017/0344057 A1* | 11/2017 | Kim | .................... G06F 1/1628 |
| 2017/0344058 A1* | 11/2017 | Kim | .................... G06F 1/1656 |
| 2017/0345291 A1* | 11/2017 | Kim | .................... G08C 17/02 |
| 2017/0346903 A1* | 11/2017 | Kim | .................... G06F 1/1698 |
| 2017/0347168 A1* | 11/2017 | Kim | .................... H04B 10/114 |

FOREIGN PATENT DOCUMENTS

JP    2011-504013 A    1/2011

* cited by examiner

*Primary Examiner* — Orlando Bousono
(74) *Attorney, Agent, or Firm* — Novick, Kim & Lee, PLLC; Sang Ho Lee; Hyun Woo Shin

(57) ABSTRACT

Detachable Internet of Things (IoT) modules can be coupled to products such as home appliances to create an IoT environment or ecosystem. The detachable IoT module includes a communication module insertable into a groove formed about an exterior surface of a home appliance and electrically connected with a controller in the home appliance, and a sensor module coupled to the communication module and electrically connected with the controller through the communication module, the sensor module capable of measuring an air state near the home appliance, where the sensor module and the home appliance are in wireless communication with an external terminal through the communication module.

13 Claims, 9 Drawing Sheets

DETACHABLE IOT MODULE

Pursuant to 35 U.S.C. § 119(a), this application claims the benefit of the Korean Patent Application No. 10-2019-0154907, filed on Nov. 27, 2019, which is hereby incorporated by reference as if fully set forth herein.

BACKGROUND

Technical Field

Technical spirits disclosed in the present specification relate to a detachable IoT module coupled to a product such as a home appliance to construct an Internet of Things environment or ecosystem.

Discussion of the Related Art

With the popularization of the smart era where everything becomes convenient, home appliances (for example, washing machine, refrigerator, air conditioner, etc.) at home or in buildings, interior products (blind, lamp, etc.) inside home, and non-home appliances such as ventilator and window have been evolved to digital products such as digital home appliances that transmit or receive data to or from each other. Therefore, a network has been constructed between the home appliances and the non-home appliances and a system that integrally manages and controls the network has been developed.

A network system which has been recently developed connects a plurality of home appliances with a server, which may integrally manage the home appliances, through a network constructed in a building, to transmit or receive data between the home appliances and the server. That is, as unique IP is given between each home appliance and non-home appliances, each appliance could access Internet network and mutually transmit or receive data.

In this way, as Internet of Things (IoT) becomes available, studies for a smart home system for utilizing devices with convenience have been actively in progress.

A wireless module should be built in each appliance to construct the IoT environment and carry out wireless communication between the respective appliances. However, problems occur in that the wireless module is expensive and it is difficult to exchange a communication mode.

SUMMARY

Accordingly, the present disclosure is directed to a detachable IoT module that substantially obviates one or more problems due to limitations and disadvantages of the related art.

An object of the present disclosure is to provide a detachable IoT module that may construct an IoT environment among various home appliances by coupling the IoT module a slot formed in a home appliance.

Another object of the present disclosure is to provide a detachable IoT module detachably provided in a home appliance and coupled to the home appliance to enable wireless communication between the home appliance and an external terminal.

Still another object of the present disclosure is to provide a detachable IoT module detachably provided in a home appliance and coupled to the home appliance to measure the air state or quality near the home appliance.

Further still another object of the present disclosure is to provide a detachable IoT module detachably provided in a home appliance and coupled to the home appliance to measure the air state or quality near the home appliance and enable wireless communication with an external terminal.

Additional advantages, objects, and features of the disclosure will be set forth in part in the description, which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, various embodiments provides a detachable IoT module comprising a communication module inserted into a groove formed about an exterior surface of a home appliance and electrically connected with a controller in the home appliance; and a sensor module coupled to the communication module and electrically connected with the controller through the communication module, measuring an air state near the home appliance, wherein the sensor module and the home appliance carry out wireless communication with an external terminal through the communication module.

The sensor module may be coupled to the communication module by surrounding the communication module to allow at least a portion of an outer circumferential surface of the communication module to be externally exposed.

The sensor module may include a first coupling portion formed to be recessed toward an inner side of the sensor module and provided with at least one coupling groove to which the communication module is attached, and the communication module may include a coupling protrusion fitted into the coupling groove.

A terminal portion electrically connected with the communication module may be formed in at least a portion of an area formed by the first coupling portion.

The communication module may include a second coupling portion inserted into the groove formed about an exterior surface of the home appliance.

The second coupling portion may be formed on a surface different from a surface to which the sensor module is coupled, on the outer circumferential surface of the communication module.

The communication module may electrically be connected with the home appliance in accordance with insertion of the second coupling portion into the groove of the home appliance, and the sensor module may electrically be connected with the communication module and the home appliance by attaching the communication module to the first coupling portion.

In another aspect of the present disclosure, various embodiments provides a detachable IoT module comprising a sensor module inserted into a groove formed about an exterior surface of a home appliance and electrically connected with a controller in the home appliance, measuring an air state near the home appliance; and a communication module coupled to the sensor module and electrically connected with the controller through the sensor module, wherein the sensor module and the home appliance carry out wireless communication with an external terminal through the communication module.

The sensor module may be coupled to the communication module by surrounding the communication module to allow at least a portion of an outer circumferential surface of the communication module to be externally exposed.

The sensor module may include a first coupling portion formed to be recessed toward an inner side of the sensor module and provided with at least one coupling groove to which the communication module is attached, and the communication module may include a coupling protrusion fitted into the coupling groove.

A terminal portion electrically connected with the communication module may be formed in at least a portion of an area formed by the first coupling portion.

The terminal portion may be provided in the form of slot.

The sensor module may include a second coupling portion inserted into the groove formed about an exterior surface of the home appliance.

The second coupling portion may be formed on a surface different from a surface to which the communication module is coupled, on an outer surface of the sensor module.

The sensor module may electrically be connected with the home appliance in accordance with insertion of the second coupling portion into the groove of the home appliance, and the communication module may electrically be connected with the sensor module and the home appliance by attaching the sensor module to the first coupling portion.

The respective features of the aforementioned embodiments may complexly be embodied in the other embodiments unless the features are conflict with or exclusive from the other embodiments.

According to various embodiments disclosed in the present specification, an IoT system that covers various home appliance groups may be post-constructed.

Also, each product group may be controlled by reflecting an external environment of a space where each product group is provided.

In one embodiment, a detachable IoT module includes a communication module configured to be inserted into a groove formed about an exterior surface of a home appliance, where the communication module can be electrically connected to a controller in the home appliance. The module further includes a sensor module configured to be coupled to the communication module and electrically connected with the controller through the communication module, the sensor module configured to measure an air state near the home appliance. In this embodiment, the sensor module and the home appliance are in wireless communication with an external terminal through the communication module.

In another embodiment, the sensor module may be configured to be coupled to the communication module by surrounding the communication module to allow at least a portion of an outer circumferential surface of the communication module to be externally exposed.

In one embodiment, the sensor module includes a first coupling portion formed to be recessed toward an inner side of the sensor module and provided with at least one coupling groove to which the communication module is attached, and the communication module includes a coupling protrusion fitted into the coupling groove.

In another embodiment, a terminal portion electrically connected with the communication module can be formed in at least a portion of an area formed by the first coupling portion. In yet another embodiment, the communication module includes a second coupling portion inserted into the groove formed about the exterior surface of the home appliance.

In one embodiment, the second coupling portion can be formed on a surface different from the surface to which the sensor module is coupled, on the outer circumferential surface of the communication module. In another embodiment, the communication module can be electrically connected with the home appliance by inserting the second coupling portion into the groove of the home appliance, and the sensor module can be electrically connected with the communication module and the home appliance by attaching the communication module to the first coupling portion.

In one embodiment, a detachable IoT module includes a sensor module inserted into a groove formed about an exterior surface of a home appliance and electrically connected with a controller in the home appliance, where the sensor module is configured to measure an air state near the home appliance. In this embodiment, the module further includes a communication module coupled to the sensor module and electrically connected with the controller through the sensor module, where the sensor module and the home appliance are in wireless communication with an external terminal through the communication module.

In one embodiment, the sensor module can be coupled to the communication module by surrounding the communication module to allow at least a portion of an outer circumferential surface of the communication module to be externally exposed. In another embodiment, the sensor module includes a first coupling portion formed to be recessed toward an inner side of the sensor module and provided with at least one coupling groove to which the communication module is attached, and the communication module includes a coupling protrusion fitted into the coupling groove.

In one embodiment, the terminal portion electrically connected with the communication module can be formed in at least a portion of an area formed by the first coupling portion. In another embodiment, the terminal portion can be provided in the form of slot.

In one embodiment, the sensor module includes a second coupling portion inserted into the groove formed about an exterior surface of the home appliance. In another embodiment, the second coupling portion can be formed on a surface different from a surface to which the communication module is coupled, on an outer surface of the sensor module. In yet another embodiment, the sensor module can be electrically connected with the home appliance in accordance with insertion of the second coupling portion into the groove of the home appliance, and the communication module can be electrically connected with the sensor module and the home appliance by attaching the sensor module to the first coupling portion.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the embodiments of the present disclosure will be described with reference to the accompanying drawings. The following detailed description is provided to assist in full understanding of a method, apparatus and/or system disclosed in the present disclosure. However, this is only exemplary, and the present disclosure is not limited to the following description.

In describing the embodiments of the present disclosure, if detailed description of elements or functions known in respect of the present disclosure is not relevant to the subject matter of the present disclosure, the detailed description will be omitted. The terms which will be described later are selected from generally known and used terms considering their functions in the present disclosure, and may be modified depending on intention of a person skilled in the art, practices, or the like. Accordingly, the terms used herein should be understood not simply by the actual terms used but by the meaning lying within and the description disclosed herein. The terms used herein are intended to describe the embodiments of the present disclosure, and should not be restrictive. It is to be understood that the singular expression used in this specification includes the plural expression unless defined differently on the context. In this description, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Also, in describing elements of the embodiments of the present disclosure, the terms "first", "second", "A", "B", "(a)", "(b)", etc. may be used. These terms are intended to identify the corresponding elements from the other elements, and basis, order, or number of the corresponding elements are not limited by these terms.

Figure 1:
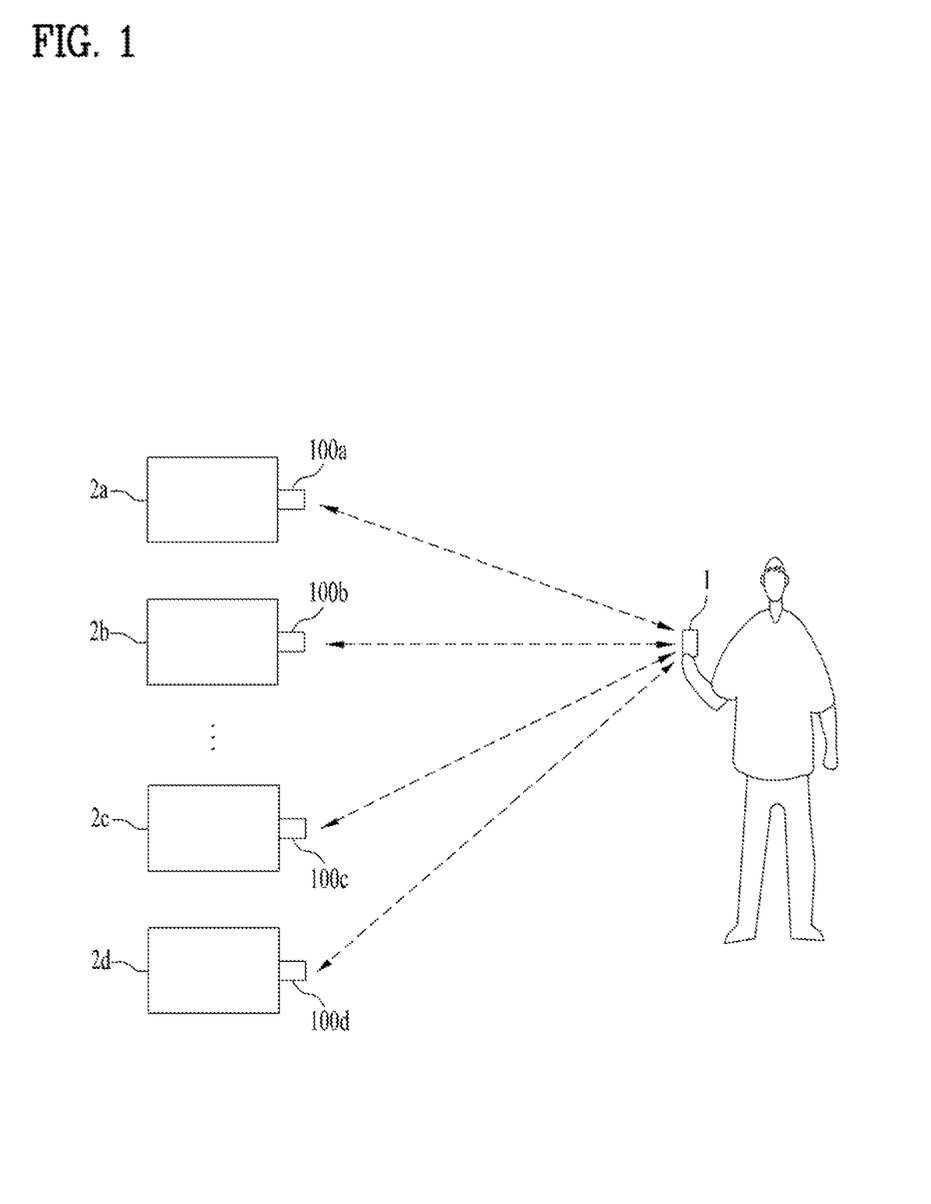
FIG. 1 is a conceptual view illustrating an IoT system according to one embodiment of the present disclosure.

FIG. 1 is a conceptual view illustrating an IoT system according to one embodiment of the present disclosure.

Hereinafter, a description will be given with reference to FIG. 1.

This embodiment relates to a detachable IoT module, and an IoT environment having a plurality of IoT modules. In one embodiment, the IoT module is a module that allows a user to control existing products inside homes at the user's desire.

An IoT system may be provided in a dwelling where a user lives, and a plurality of home appliances 2 that may change the state of the air quality inside or outside of the dwelling may be provided in the same dwelling. The home appliance 2 may include various home appliances, which may be manipulated in the dwelling by the user, to change the state of the outdoor or indoor air.

For reference, the home appliance 2 may include the following products:

TV, set-top box, video player, audio player, home theater, game machine for home use, beam projector, computer, notebook computer, printer, monitor, router (IP router, hub, wireless router), refrigerator, dish washer, food dryer, electric pot, mixer, juicer, electric grill, coffee machine (coffee maker), yogurt maker, double boiler, boiling pot, washing machine, drying machine, dehydrator, food waste disposer, laundry processor, iron (normal, steam), bidet, electric toothbrush, electric shaver, skin care device, water purifier, cold and hot water dispenser, electric rice cooker, microwave oven, electric oven, hair dryer, lamp, clock (including digital and analog), electric range, gas range, electric gas valve, humidifier, dehumidifier, air conditioner, air cleaner, air washer, fan, cold fan, electric heater, electric mat, hot water mat, diffuser, baby bottle sterilizer, ultraviolet sterilizer, boiler, solar cell, solar heater, cleaner, digital door lock, weight scale, thermometer, hygrometer, electromagnetic wave meter, in vitro diagnostic device for home use, electric exercise machine, electric massager, electric riding toy for kids, electric action toy, telephone, interphone, etc.

In operation, the home appliances 2 may be controlled by the user. The user may seek a change in his/her living space by controlling the home appliances 2 through an external terminal 1. The external terminal 1 may be provided as a terminal that enables communication. Examples of external terminal 1 may include devices including without limitation mobile phones, mobile tablet or mobile computer. External terminals 1 may also include computers or other electronic devices capable of wired or wireless communication with home appliances 2.

In one embodiment, the home appliances 2 may be controlled by the user through physical contact or actual physical touching of the home appliances 2. In other embodiments, the home appliances 2 may be controlled by the user via wireless communication through external terminal 1 and the IoT module 100, or may be controlled physically by the user.

The user may control the home appliances 2, for example, humidifier, heater, and air conditioner. The user may control temperature or humidity of an indoor environment by controlling vapor spray capacity of a humidifier or the intensity of a heater. In another example, the user may control an indoor temperature and cleanliness of the air by controlling an air conditioning unit.

The user may control the home appliances 2 through the IoT module 100 and the external terminal 1. The external terminal 1 and the home appliance 2 may carry out mutual wireless communication through the IoT module 100. The user may identify the air state near the home appliance 2 through the IoT module 100. The air state may include, without limitations, parameters such as temperature, humidity and particulate matter (PM) concentration near the home appliance 2, among other quality indicators of outdoor or indoor air state.

There are various wireless communication modes between the home appliance 2 and the external terminal 1. For example, Bluetooth, ZigBee, WiFi, among others, may be used, and various specifications such as power line communication and wireless power communication may be used.

Figure 2:
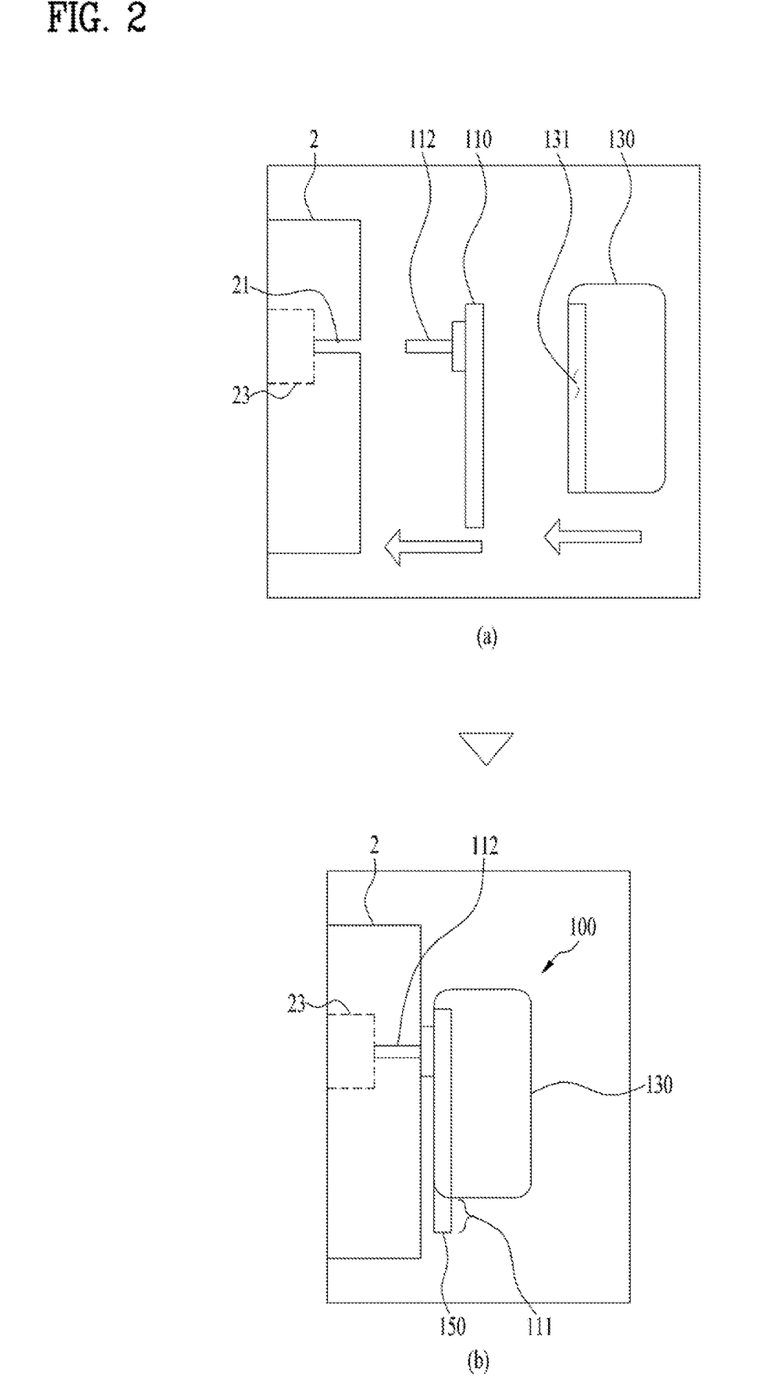
FIG. 2 illustrates a structure of an IoT module detachably attached to a home appliance according to one embodiment.
Figure 3:
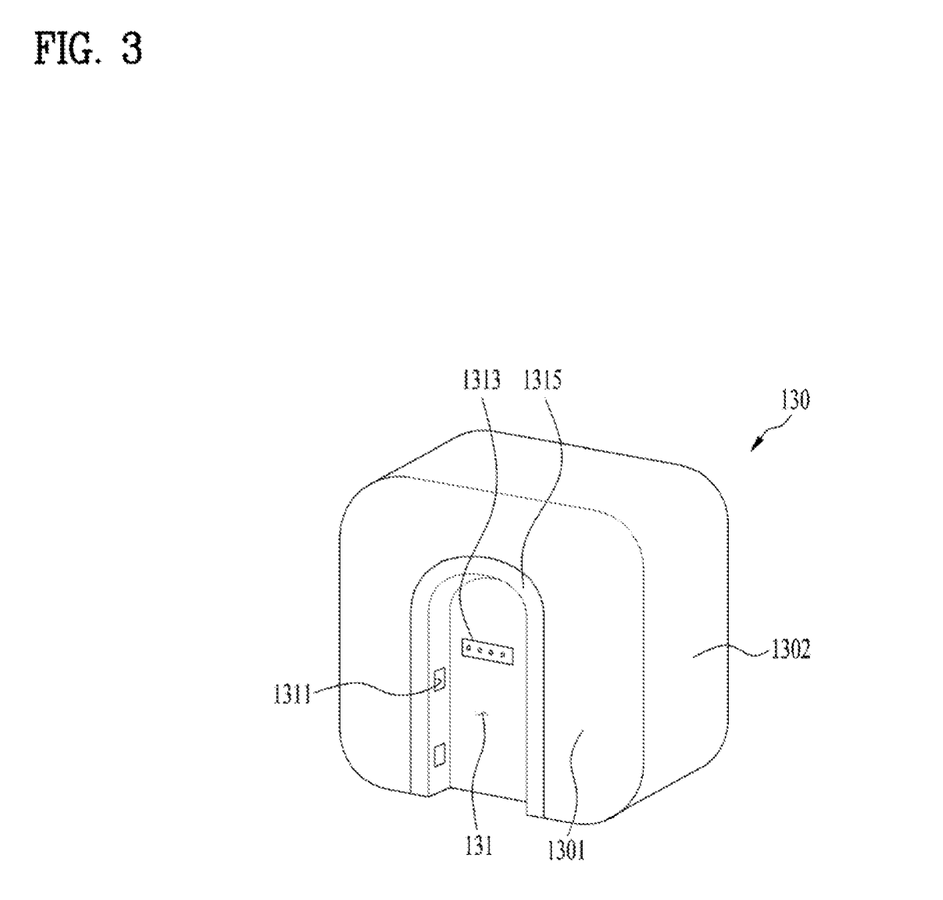
FIG. 3 illustrates a sensor module of FIG. 2.
Figure 4:
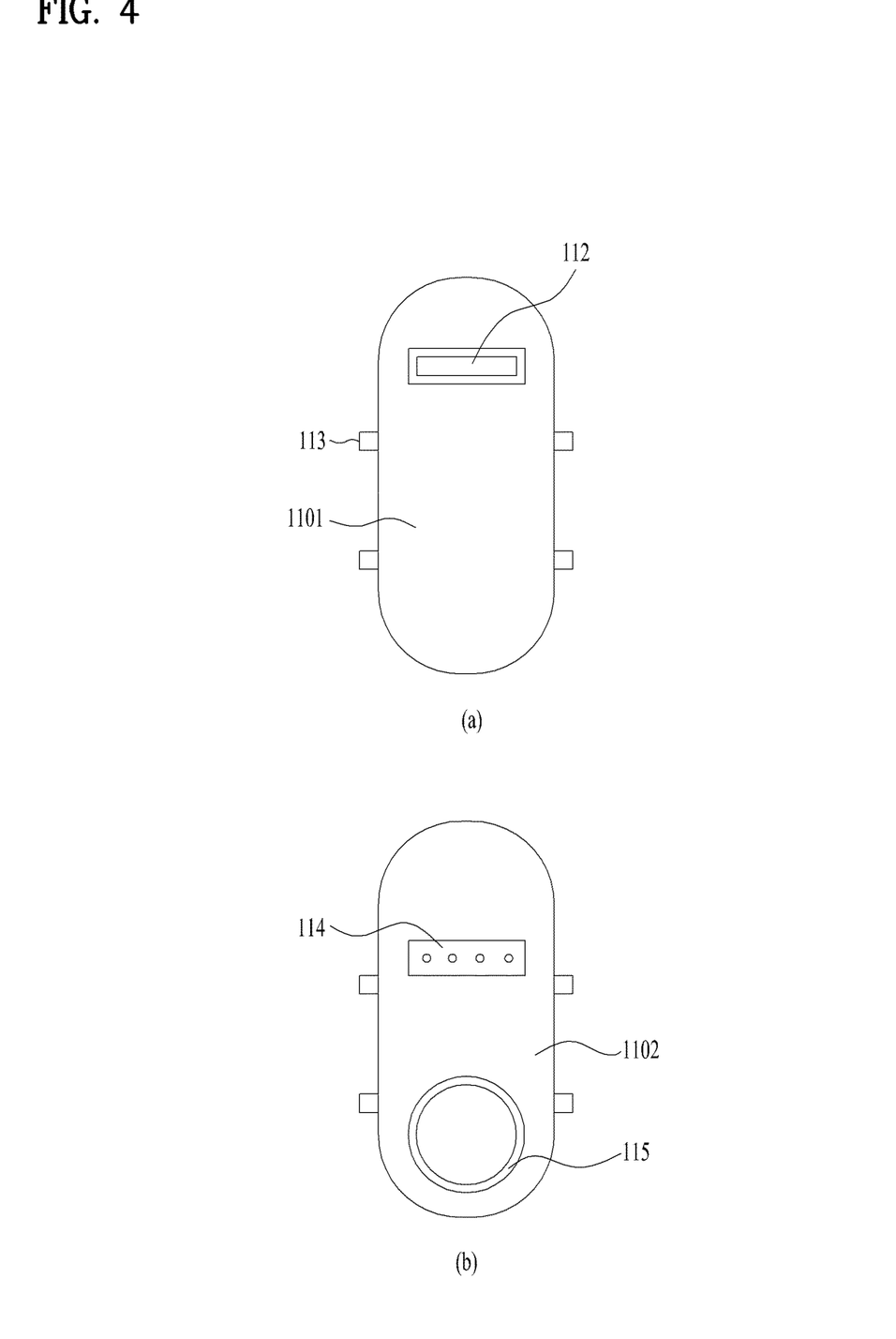
FIG. 4 illustrates a communication module of FIG. 2.
Figure 5:
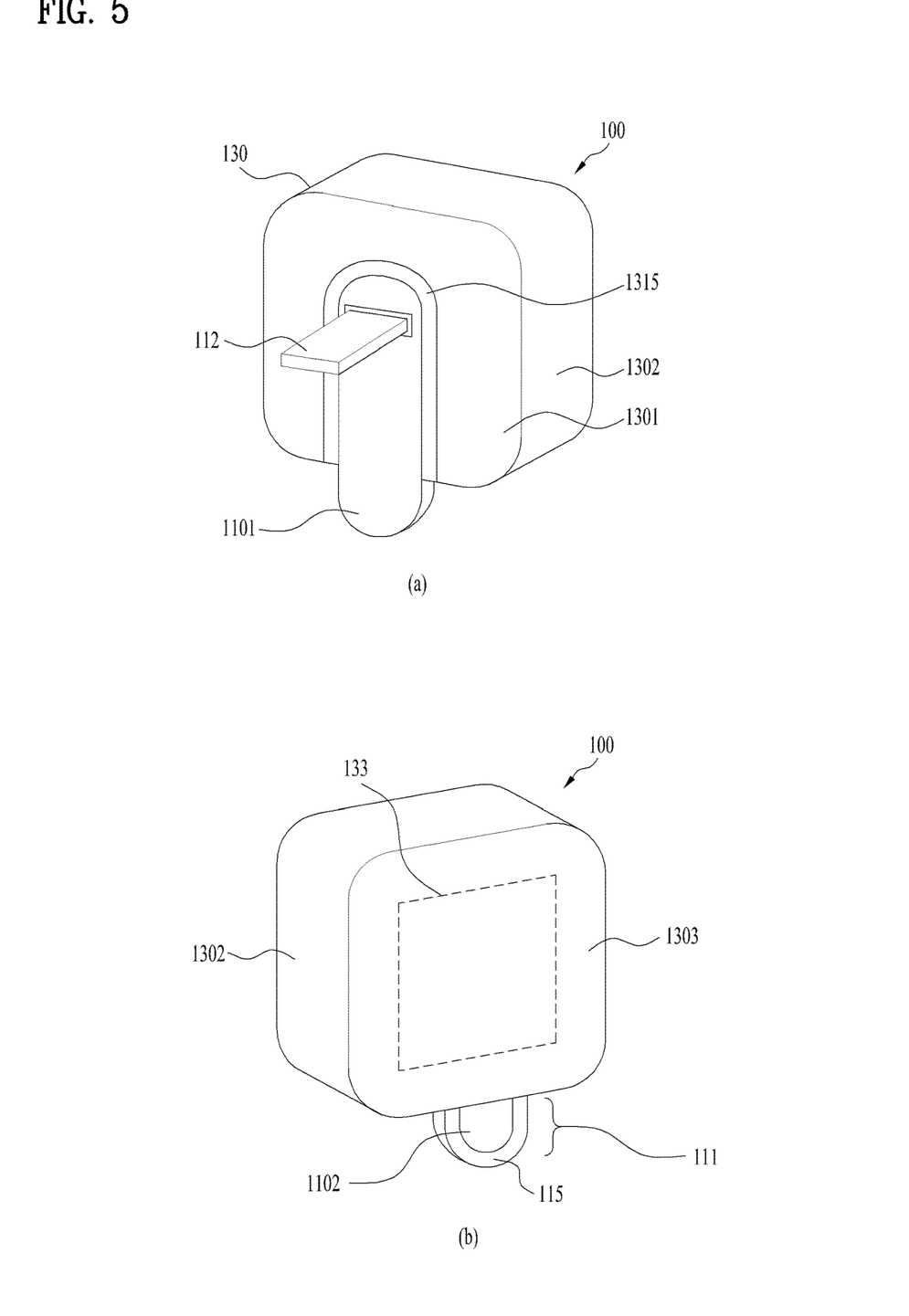
FIG. 5 illustrates an IoT module of FIG. 2.

FIG. 2 illustrates a structure of one embodiment of an IoT module 100 detachably attached to a home appliance 2, FIG. 3 illustrates a sensor module 130 of FIG. 2, FIG. 4 illustrates a communication module 110 of FIG. 2, and FIG. 5 illustrates an IoT module 100 of FIG. 2.

Hereinafter, a description will be given with reference to FIGS. 1 to 5.

The home appliance 2 of this embodiment is manufactured in such a manner that a controller 23 is provided with a circuit board, a control module, etc. is built therein to control each product of the home appliance 2 when each product of the home appliance 2 is manufactured therein.

In one embodiment, a groove 21 is formed about an exterior surface of the home appliance 2. The groove 21 is a space into which the detachable IoT module 100 may be inserted therein. The groove 21 may be provided to be in communication with the controller 23 in the home appliance 2. As the IoT module 100 is inserted into the groove 21, the IoT module 100 may electrically be connected with the controller 23 provided in the home appliance 2. In some embodiments, memory card socket, SD, MicroSD, CF, MMC and similar type of grooves may be used as the groove 21. The size of the wireless module may be varied depending on the wireless mode used, and the size of the groove may be adjusted in accordance with the wireless operating mode.

In one embodiment, the IoT module 100 is electrically connected with the home appliance 2 in accordance with insertion of the IoT module 100 into the groove 21, the user may control the home appliance 2 through the external terminal 1.

In one embodiment, the IoT module 100 includes a communication module 110 and a sensor module 130.

In one embodiment, the communication module 110 may be inserted into a groove 21 formed about an exterior surface of the home appliance 2 and electrically connected with the controller 23 provided in the home appliance 2. The home appliance 2 may be in communication with an external terminal 1 through the communication module 110. That is, the user may control the home appliance 2 through the external terminal 1 in accordance with the communication module 110.

In one embodiment, the sensor module 130 may be coupled to the communication module 110 and electrically connected with the controller 23 provided in the home appliance 2 through the communication module 110. In operation, the sensor module 130 is capable of measuring the air state near the home appliance 2.

Optionally, information on the air state near the home appliance, which may be measured by the sensor module 130, may be displayed on the external terminal 1 of the user through the communication module 110. That is, the sensor module 130 and the home appliance 2 may be in wireless communication with the external terminal 1 through the communication module 110.

Examples of the state of air quality near the home appliance, which can be measured by the sensor module 130, may include parameters such as temperature, humidity, and fine dust, among others. The information, such as temperature, humidity and fine dust, can be measured through the sensor module 130, may be transmitted to the terminal 1 through the communication module 110.

The user may identify the measured information such as the temperature, humidity and fine dust through the external terminal 1. In some embodiments, temperatures in Celsius may be displayed, and values for percentages of humidity in the air may be displayed. Also, a unit of ppm or $\mu g/m^3$ may be displayed in case of fine dust.

In one embodiment, the sensor module 130 may include a gas sensor. In another embodiment, a volatile organic compound (VOC) sensor may be used. The VOC sensor may measure organic compounds having high vapor pressure at room temperature, such as total volatile organic compounds. For example, the VOC sensor may measure cancer-causing agents, which can damage the central nervous system, including without limitation fossil fuel, benzene, methylene chloride, formaldehyde, and acetaldehyde. In yet another embodiment, the sensor module 130 may include a ccs811 sensor.

In one embodiment, the sensor module 130 is configured to surround the communication module 110 to externally expose at least a portion of an outer circumferential surface of the communication module 110, and may detachably be coupled to the communication module 110. Therefore, if the communication module 110 and the sensor module 130 are coupled to each other, a portion 111 of the communication module may be externally exposed, as best illustrated in FIG. 2(b).

The externally exposed portion 111 may allow the communication module 110 to actively transmit and receive information to and from the external terminal 1. If the exposed portion 111 does not exist, an inner surface 1101 and an outer surface 1102 of the communication module 110 are covered by the home appliance 2 and the sensor module 130, whereby an azimuth angle for signal transmission and reception may not be formed. Therefore, in the same manner as this embodiment, when the IoT module 100 is coupled to the home appliance 2, the exposed portion 111 is formed in at least a portion of the outer circumferential surface of the communication module 110, whereby the azimuth angle for signal transmission and reception can be established.

The sensor module 130 may include a first coupling portion 131 formed to be recessed toward an inner side of the sensor module 130 and provided with at least one coupling groove 1311 to which the communication module is attached.

The first coupling portion 131 is a predetermined recessed space where the communication module 110 is mounted, and the sensor module 130 may be supported in the communication module 110 by the first coupling portion 131. The coupling groove 1311 may be formed in a portion of the recessed inner surface of the first coupling portion 131.

The coupling groove 1311 is a groove into which a coupling protrusion 113 formed in the communication module 110 may be fitted. The coupling groove 1311 and the coupling protrusion 113 may be provided for enhancing the coupling between the sensor module 130 and the communication module 110.

A terminal portion 1313 electrically connected with the communication module 110 may be formed in at least a portion of an area formed by the first coupling portion 131. The terminal portion 1313 is engaged with a terminal portion 114 formed on the outer surface 1102 of the communication module 110.

As the terminal portion 1313 of the sensor module is coupled with the terminal portion 114 of the communication module, the sensor module 130 is electrically connected with the communication module 110. The communication module 110 may be inserted into the groove 21 of the home appliance 2 and thus electrically connected with the controller 23 in the home appliance 2. The sensor module 130 may also be electrically connected with the controller 23 in the home appliance 2.

As the sensor module 130 is electrically connected with the controller 23, the information of the air state or quality measured by the sensor module 130 may be shared with the controller 23 in the home appliance 2. Also, the sensor module 130 may receive the power supplied from the home appliance 2 through the controller 23.

A reinforcement member 1315 may be provided in the inner surface 1301 of the sensor module 130. The reinforcement member 1315 may be provided along a boundary of a recessed portion formed by the first coupling portion 131. Durability of the portion where the sensor module is coupled with the communication module may be reinforced by the reinforcement member 1315. The sensor module 130 may more stably be grasped in the communication module 110 by the reinforcement member 1315.

In one embodiment, the sensor module 130 includes an inner surface 1301, a side surface 1302, and an outer surface 1303, and may be provided with an external appearance. A display 133 may be formed on any one of the inner surface 1301, the side surface 1302, or the outer surface 1303.

In one embodiment, the air state or quality measured by the sensor module 130 may be displayed on the display 133. In another embodiment, a type of a control signal input from the external terminal 1 may be displayed on the display 133. In some embodiments, remaining power capacity of the sensor module 130 and the home appliance 2 may be displayed on the display 133. In addition to the aforementioned information, information such as the air state described in this embodiment, control command, control information, and information such as a current state of the products may be displayed on the display 133 to provide a user with visual information. In one embodiment, the display 133 may be formed on the outer surface 1303 of the sensor module 130. However, it will be appreciated that a position of the display 133 and a shape of the display may be implemented in various ways.

The sensor module 130 includes an inner surface, a side and an outer surface, and is provided with a space formed therein. Various types of sensors may be provided in the space.

The communication module 110 includes a second coupling portion 112 capable of being inserted into the groove 21 formed about an exterior surface of the home appliance 2. The second coupling portion 112 can be formed on a surface of the outer surface of the communication module 110, which may be different from a surface where the sensor module 130 adjoins.

The communication module 110 includes the inner surface 1101, the outer surface 1102, and a side connecting the inner surface with the outer surface to form an external appearance.

The second coupling portion 112 is formed on the inner surface 1101, and the coupling protrusion 113 is formed to be protruded on the side. The terminal portion 114 may be formed on the outer surface 1102, and a state display 115 may be formed thereon.

The second coupling portion 112 is inserted into the groove 21 formed on the outer surface of the home appliance 2 and thus electrically connects the communication module 110 with the controller 23. As the communication module 110 is electrically connected with the controller 23, the user may control the home appliance 2 through the external terminal 1.

The air state, which may be collected through the sensor module 130 and stored in the controller 23, may be transmitted to the external terminal 1, whereby the user may visually check the air state through the external terminal 1.

The state display 115 may be displayed on the outer surface 1102 of the sensor module 130. The state display 115 may be provided as a lighting device. The state display 115 may transfer, to the user, visual information as to whether the communication module 110 and the external terminal 1 carry outs wireless communication. The information transferred by the state display 115 may not be restrictive, for example, a remaining power capacity of the sensor module and the home appliance may be displayed, and the external air state measured by the sensor module may be displayed.

If the IoT module 100 is coupled to the home appliance 2, since the state display 115 and the display 133 are formed on a surface visually exposed when the user views the home appliance 2, intuitive visual information may be transferred to the user through the state display 115 and the display 133.

The communication module 110 includes the inner surface, the outer surface and the side connecting the inner surface with the outer surface, and is provided with a space formed therein. A transceiving module (not shown), which may be in communication with the external terminal 1, may be provided in the inner space of the communication module 110. The transceiving module (not shown) may be provided near the state display 115 in the inner space of the communication module 110. At least a portion of the state display 115 is a portion 111 of the outer surface of the communication module 110, which is externally exposed, and thus may more actively carry out wireless communication with the external terminal by an inner arrangement structure of the aforementioned transceiving module.

The communication module 110 and the sensor module 130 may be provided detachably from each other. As the communication module 110 is coupled with the sensor module 130, the IoT module 100 is formed. As the IoT module 100 is coupled to the home appliance 2, the IoT module 100 is electrically connected with the home appliance 2.

The communication module 110 is coupled to the outer surface of the home appliance 2 and the sensor module 130 is coupled to the outer surface 1102 of the communication module 110, whereby a deposited structure may be described in the order of the home appliance, the communication module and the sensor module. At least a portion of the outer surface of the communication module 110 may externally be exposed to carry out active wireless communication with the external terminal 1. The state display 115 may be provided on the surface toward the outer surface of the communication module in the externally exposed portion 111.

By the aforementioned configuration, as the second coupling portion 112 is inserted into the groove 21 of the home appliance 2, the communication module 110 is electrically connected with the home appliance 2. As the sensor module 130 fixes the communication module 110 to the first coupling portion 131, the sensor module 130, the communication module 110 and the home appliance 2 are electrically connected with one another.

Figure 6:
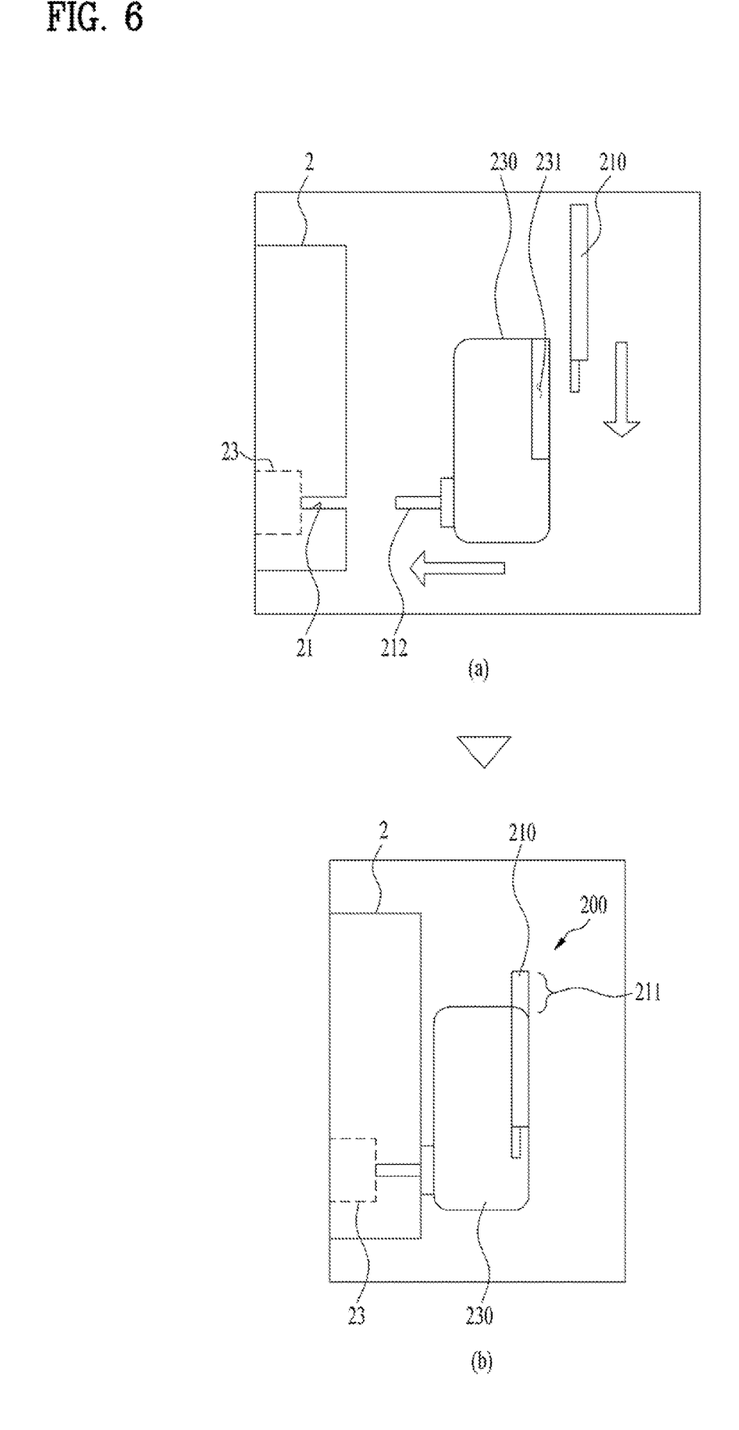
FIG. 6 illustrates a structure of an IoT module detachably attached to a home appliance according to one embodiment.
Figure 7:
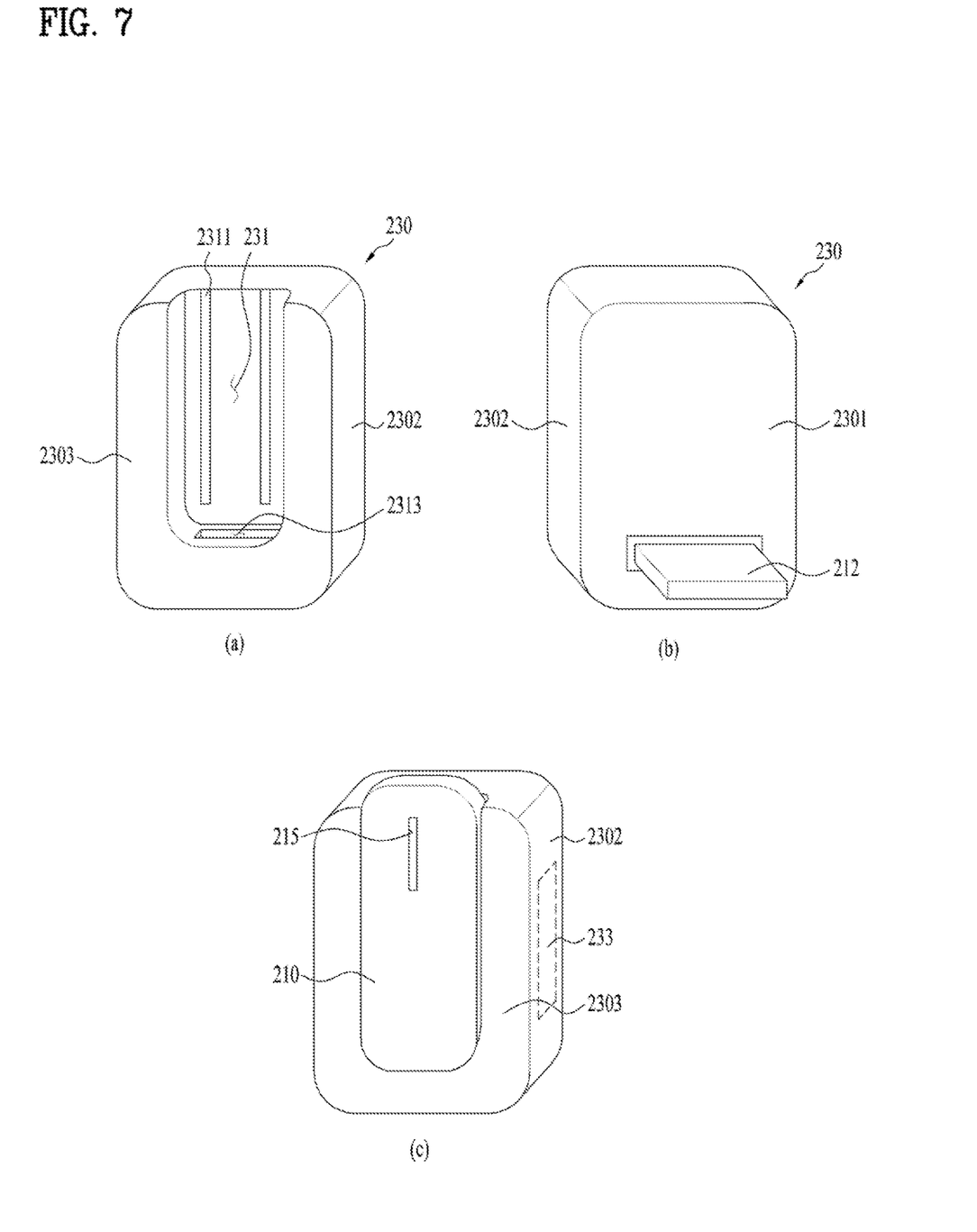
FIG. 7 illustrates an IoT module of FIG. 6.

FIG. 6 illustrates a structure of another embodiment of an IoT module detachably attached to a home appliance, and FIG. 7 illustrates an IoT module of FIG. 6.

Hereinafter, a description will be given with reference to FIGS. 6 and 7. In comparison with the embodiment described with reference to FIGS. 2 to 5, the embodiment described with reference to FIGS. 6 and 7 may be understood that the position where the sensor module and the communication module are coupled with each other is changed based on the home appliance 2. Repeated description of the aforementioned description will be omitted.

An IoT module 200 of this embodiment may include a sensor module 230 inserted into a groove 21 formed about an exterior surface of the home appliance 2 and thus electrically connected with the controller 23 provided in the home appliance 2, measuring an air state near the home appliance 2, and a communication module 210 coupled to the sensor module 230 and thus electrically connected with the controller 23 through the sensor module 230.

The sensor module 230 and the home appliance 2 may carry out wireless communication with the external terminal 1 through the communication module 210. In this embodiment, the IoT module 200 is provided detachably from the home appliance 2.

The sensor module 230 may be coupled with the communication module 210 by surrounding the communication module 210 to allow at least a portion of an outer circumferential surface of the communication module 210 to be externally exposed. The communication module 210 of this embodiment is inserted into the sensor module 230, and its outer surface is opened and thus a portion 211 exposed to the outside may correspond to most of the outer surface of the communication module 210.

The communication module 210 is inserted into the sensor module 230 and thus most of the outer surface of the communication module 210 is arranged inside the sensor module 230, whereby the communication module 210 may be covered by the sensor module 230. In this embodiment, a portion corresponding to the exposed portion 211 in the communication module 210 not covered by the sensor module 230 may carry out active communication.

The sensor module 230 includes a first coupling portion 231 formed to be recessed toward the inner side of the sensor module 230 and provided with at least one coupling groove 2311 to which the communication module 210 is attached, and the communication module 210 may include a coupling protrusion (not shown) fitted into the coupling groove 2311.

The coupling groove 2311 of this embodiment may be formed along a length direction of the first coupling portion 231. The coupling groove 2311 may be formed along an insertion direction of the communication module 210. The coupling groove 2311 may be formed on a portion of a recessed surface recessed toward the inner side of the sensor module. The recessed portion formed by the recessed surface may be understood as the first coupling portion 231.

The communication module 210 of this embodiment may be inserted into the sensor module 230 from up to down. Therefore, the coupling protrusion formed in the communication module 210 may be provided in various shapes fitted into the coupling groove 2311. For example, the coupling protrusion may be provided in a rib shape and guided along the coupling groove 2311, whereby the communication module 210 may be coupled to the sensor module 230.

A terminal portion 2313 electrically connected with the communication module 210 may be formed in at least a portion of an area formed by the first coupling portion 231. The terminal portion 2313 may be provided in the form of slot. The terminal portion 2313 provided in the form of slot may be formed to be recessed along an insertion direction of the communication module 210 into the sensor module 230. As the terminal portion 2313 is provided in the form of slot, the communication module 210 may more stably be inserted into the sensor module 230 and then attached thereto.

The sensor module 230 may include a second coupling portion 212 inserted into the groove 21 formed about an exterior surface of the home appliance 2. The second coupling portion 212 may be formed on a surface different from a surface, to which the communication module 210 is coupled, on the outer surface of the sensor module 230.

The sensor module 230 includes an inner surface 2301, a side 2302, and an outer surface 2303, and is provided with a space formed therein. Various types of sensors may be provided in the inner space of the sensor module. A display 233 may be formed at the side 2302.

By the aforementioned configuration, as the second coupling portion 212 is inserted into the groove 21 of the home appliance 2, the sensor module 230 is electrically connected with the home appliance 2, and the communication module 210 is attached to the first coupling portion 231 of the sensor module 230, whereby the sensor module 230, the communication module 210 and the home appliance 2 are electrically connected with one another.

Figure 8:
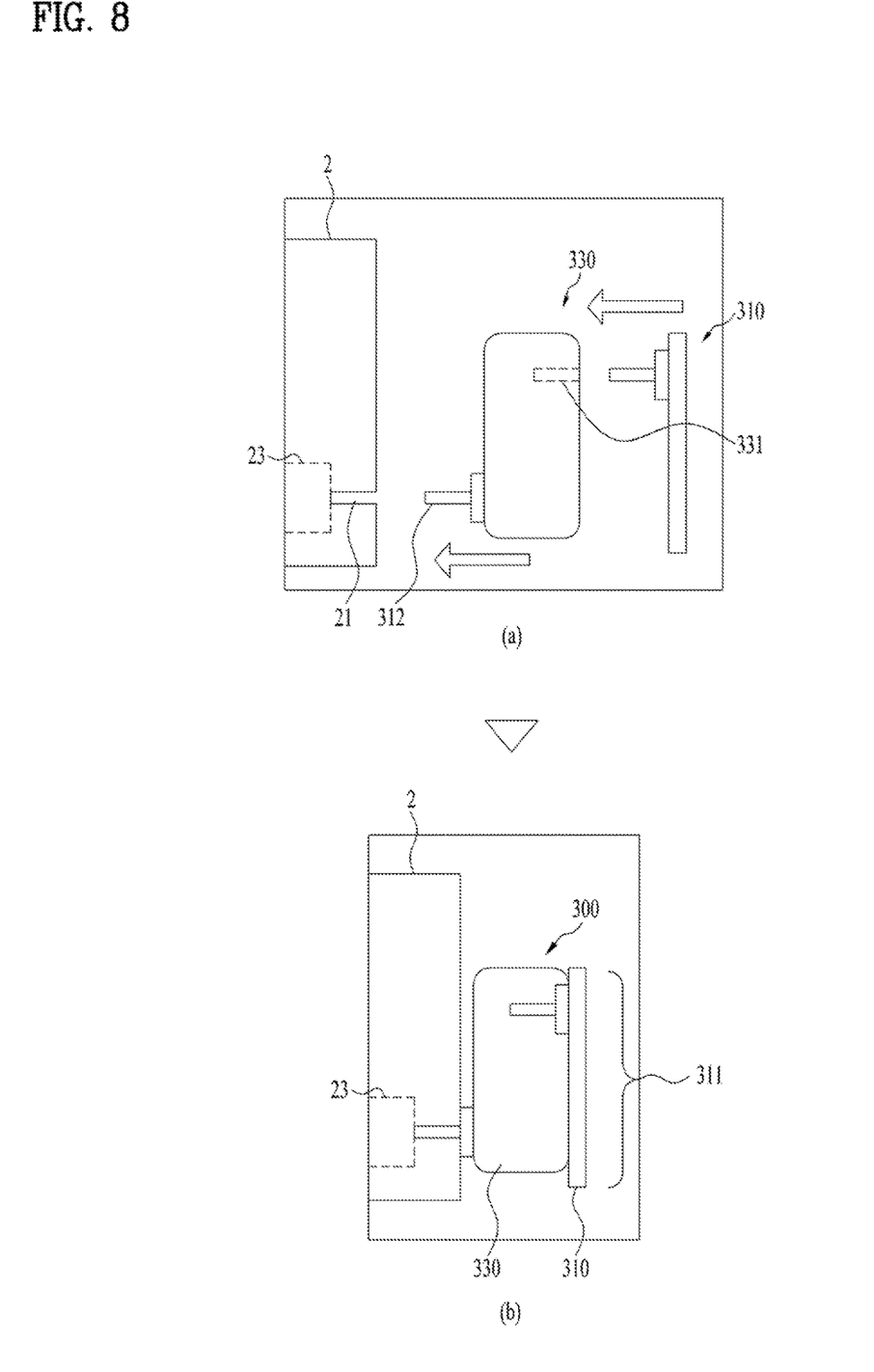
FIG. 8 illustrates a structure of an IoT module detachably attached to a home appliance according to one embodiment.
Figure 9:
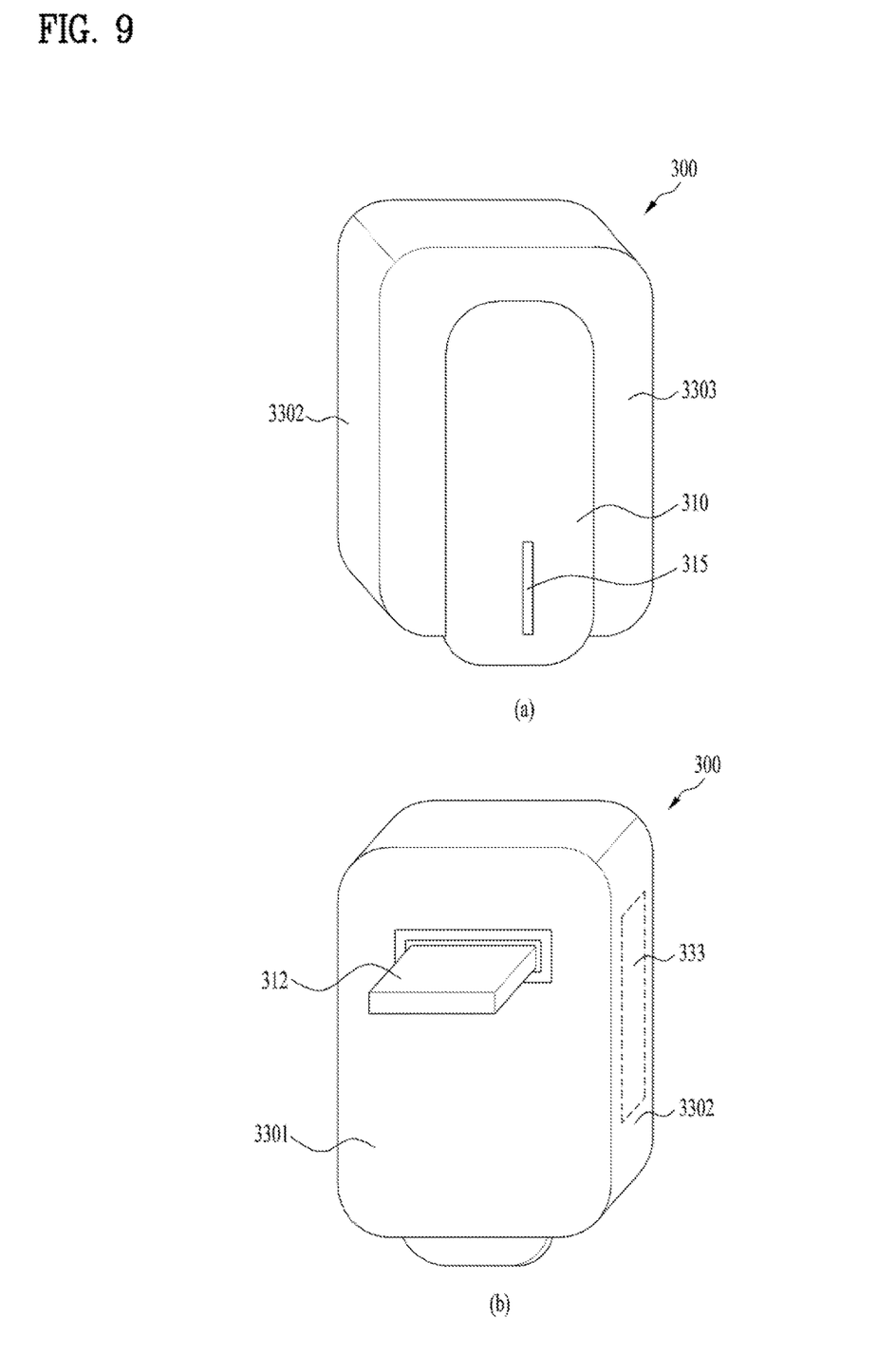
FIG. 9 illustrates an IoT module of FIG. 8.

FIG. 8 illustrates a structure of other embodiment of an IoT module detachably attached to a home appliance, and FIG. 9 illustrates an IoT module of FIG. 8.

Hereinafter, a description will be given with reference to FIGS. 8 and 9. In comparison with the embodiment described with reference to FIGS. 2 to 5, the embodiment described with reference to FIGS. 8 and 9 may be understood that the position where the sensor module and the communication module are coupled with each other is changed based on the home appliance 2.

In comparison with the embodiment described with reference to FIGS. 6 and 7, the embodiment described with reference to FIGS. 8 and 9 may be understood that a coupling structure of the communication module and the sensor module is changed. Therefore, repeated description of the aforementioned description will be omitted.

The sensor module 330 of this embodiment includes a first coupling portion 331. The first coupling portion 331 may be formed to be recessed along an insertion direction of a coupling protrusion (not shown) formed in the communication module 310. The first coupling portion 331 may be formed to be recessed toward an inner side of the sensor module 330 from an outer surface of the sensor module 330.

A direction of the communication module 310 coupled to the sensor module 330 is equal to a direction of the sensor module 330 coupled to the home appliance 2. In more detail, the coupling protrusion formed in the communication module 310 is provided to be extended along the direction of the communication module 310 coupled to the sensor module 330 in this embodiment. The coupling protrusion may be provided to be similar to a shape of the second coupling portion 312.

Therefore, one surface of the communication module 310 of this embodiment may be understood as a portion 311 exposed to the outside. That is, one surface of the IoT module 300 provided in the home appliance 2 may be formed by the communication module 310. However, in this case, a coupling force of the communication module 310 coupled to the sensor module 330 may be weakened. This is because that the coupling force of the communication module 310 should be ensured by the coupling protrusion.

Referring to FIG. 9, the sensor module 330 of this embodiment may include a first coupling portion 311 provided as a recessed surface to which the communication module 310 is attached. The first coupling portion 311 may mean a surface recessed toward an inner direction of the sensor module 330 from an outer surface of the sensor module 330, mean a groove into which a coupling protrusion of the communication module 310 is inserted, or mean both the recessed surface and the groove into which the coupling protrusion of the communication module is inserted.

As the recessed surface is formed in the sensor module 330 and the communication module 310 is arranged on the recessed surface, the communication module 310 may be attached to the sensor module 330 more stably.

The communication module 310 may include a state display 315.

The sensor module 330 may include an outer surface 3303, a side 3302, and an inner surface 3301, and an external appearance may be formed by each surface. A display 333 may be provided at the side 3302.

The sensor module 330 may be provided with an inner space formed by each surface. The aforementioned various types of sensors may exist in the inner space. The display 333 may be formed at the side 3302.

By the aforementioned configuration, as the second coupling portion 312 is inserted into the groove 21 of the home appliance 2, the sensor module 330 is electrically connected with the home appliance 2, and the communication module 310 is attached to the first coupling portion 331 of the sensor module 330, whereby the sensor module 330, the communication module 310 and the home appliance 2 are electrically connected with one another.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A detachable IoT module comprising:
   a communication module configured to be inserted into a groove formed about an exterior surface of a home appliance, the communication module electrically connected with a controller in the home appliance; and
   a sensor module configured to be coupled to the communication module and electrically connected with the controller through the communication module, the sensor module configured to measure an air state near the home appliance,
   wherein the sensor module and the home appliance are in wireless communication with an external terminal through the communication module,
   wherein the sensor module is configured to be coupled to the communication module by surrounding the communication module to allow at least a portion of an outer circumferential surface of the communication module to be externally exposed.

2. The detachable IoT module of claim 1, wherein the sensor module includes a first coupling portion formed to be recessed toward an inner side of the sensor module and provided with at least one coupling groove to which the communication module is attached, and the communication module includes a coupling protrusion fitted into the at least one coupling groove.

3. The detachable IoT module of claim 2, wherein a terminal portion electrically connected with the communication module is formed in at least a portion of an area formed by the first coupling portion.

4. The detachable IoT module of claim 2, wherein the communication module includes a second coupling portion inserted into the groove formed about the exterior surface of the home appliance.

5. The detachable IoT module of claim 4, wherein the second coupling portion is formed on a surface different from the surface to which the sensor module is coupled, on the outer circumferential surface of the communication module.

6. The detachable IoT module of claim 5, wherein the communication module is electrically connected with the home appliance by inserting the second coupling portion into the groove of the home appliance, and the sensor module is electrically connected with the communication module and the home appliance by attaching the communication module to the first coupling portion.

7. A detachable IoT module comprising:
   a sensor module inserted into a groove formed about an exterior surface of a home appliance and electrically connected with a controller in the home appliance, the sensor module configured to measure an air state near the home appliance; and
   a communication module coupled to the sensor module and electrically connected with the controller through the sensor module,
   wherein the sensor module and the home appliance are in wireless communication with an external terminal through the communication module,
   wherein the sensor module is coupled to the communication module by surrounding the communication module to allow at least a portion of an outer circumferential surface of the communication module to be externally exposed.

8. The detachable IoT module of claim 7, wherein the sensor module includes a first coupling portion formed to be recessed toward an inner side of the sensor module and provided with at least one coupling groove to which the communication module is attached, and the communication module includes a coupling protrusion fitted into the at least one coupling groove.

9. The detachable IoT module of claim 8, wherein a terminal portion electrically connected with the communication module is formed in at least a portion of an area formed by the first coupling portion.

10. The detachable IoT module of claim 9, wherein the terminal portion is provided in the form of slot.

11. The detachable IoT module of claim 8, wherein the sensor module includes a second coupling portion inserted into the groove formed about an exterior surface of the home appliance.

12. The detachable IoT module of claim 11, wherein the second coupling portion is formed on a surface different from a surface to which the communication module is coupled, on an outer surface of the sensor module.

13. The detachable IoT module of claim 12, wherein the sensor module is electrically connected with the home appliance in accordance with insertion of the second coupling portion into the groove of the home appliance, and the communication module is electrically connected with the sensor module and the home appliance by attaching the sensor module to the first coupling portion.

* * * * *